(Model.)
E. WAYLAND.
HORSE HAY RAKE.
No. 286,659. Patented Oct. 16, 1883.
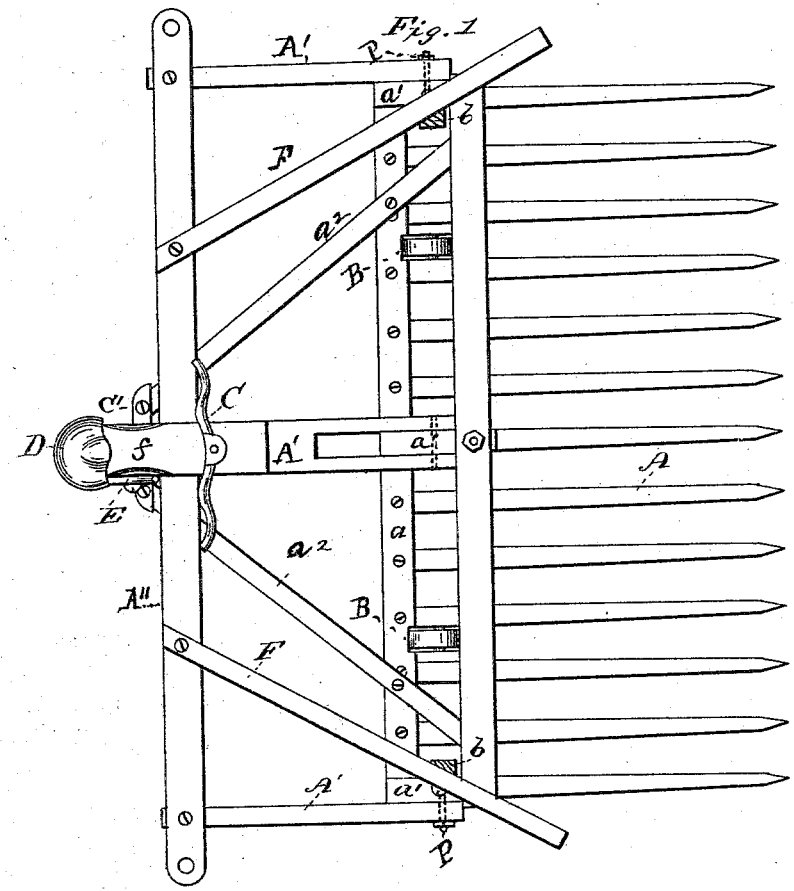
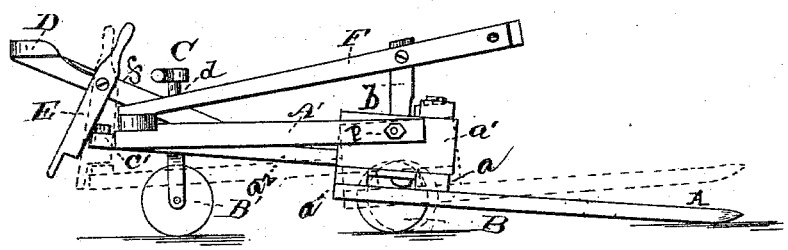
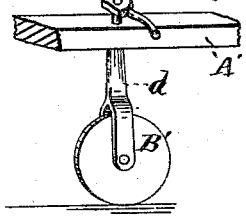
WITNESSES
Chas. R. Burr
W. E. Bowen
INVENTOR
Eli Wayland
By J. Myers & Co.
Attorneys

UNITED STATES PATENT OFFICE.

ELI WAYLAND, OF MONROE CITY, MISSOURI.

HORSE HAY-RAKE.

SPECIFICATION forming part of Letters Patent No. 286,659, dated October 16, 1883.

Application filed May 24, 1883. (Model.)

*To all whom it may concern:*

Be it known that I, ELI WAYLAND, a citizen of the United States of America, residing at Monroe City, in the county of Monroe and State of Missouri, have invented certain new and useful Improvements in Horse Hay-Rakes, of which the following is a specification, reference being had therein to the accompanying drawings.

My invention relates to an improvement in horse hay-rakes, having for its object to promote facility of operation, and to effect the ready guiding of the rake; and it consists in the combination and arrangement of parts, substantially as hereinafter fully set forth and claimed.

In the accompanying drawings, Figure 1 is a plan view of my rake. Fig. 2 is a side view of the same, and Fig. 3 is a detail perspective view thereof.

In carrying into effect my invention I employ a rake, A, preferably of the construction shown, and pivot it to a frame, A'. The rake-teeth are secured to the head, consisting of the two cross-bars $a\ a$, Fig. 2. The blocks $a'$ are fastened to the head $a\ a$, and through these blocks and the side bars and center bar of the frame A' pass the pivots by which the rake and frame are pivoted together. To the outer blocks, $a'$, are also pivoted the posts or uprights $b$, the upper outer sides of which are mortised or reduced obliquely from the front to rear to receive the frame-bars F F. These frame-bars F F have their rear ends secured to the draft-bar A'' of the frame A', while near their front ends they are secured in the obliquely-mortised upper ends of the uprights $b$.

To the rake-head $a\ a$ are secured the converging bars $a^2\ a^2$, which extend back under the draft-bar A'' of the frame A', their rear ends being connected by the short cross-bar C'.

The rake is mounted upon two wheels, B B, while the frame A', to which it is pivoted, is mounted upon a rear steering-wheel, B', the spindle $d$ of which latter wheel bears in the center piece of the frame, and has connected to its upper end, so as to turn with it, a cross-bar or foot-support, C, by means of which the driver with his feet can guide said wheel so as to turn or change the direction of the rake.

D is the driver's seat, arranged upon the frame A' in proximity to the foot or cross-bar C.

Pivoted to the supporting-bar $f$ of the seat is a hand-lever, E, capable of convenient manipulation by the hand of the driver, and adapted at its lower end to engage with or be disengaged from the rear cross-bar, C', of the rake, as indicated in full and dotted lines in Fig. 2.

When a load is collected, the points of the rake-teeth may be elevated, so as to transport the load, by pressing down on the bars $a^2$, near the bar C', and the rake is secured in that position by the engagement of the lever E with said bar C'. Thus constructed, the driver is enabled to readily guide and control the adjustable rake, and to deposit its contents, as collected, at suitable intervals.

Having thus fully described my invention, what I claim, and desire to secure by Letters Patent, is—

1. In a horse hay-rake, the combination, with the rake, pivoted to a frame, and having bars extending back under the rear cross-bar of said frame, of the lever pivoted to the seat-supporting bar, and adapted to engage with and be disengaged from the rear extension of the said rake-bars, substantially as and for the purpose set forth.

2. The combination of the rake A, pivoted to the frame A', the steering-wheel B', foot or cross bar C, seat D, and hand-lever E, substantially as shown, and for the purpose described.

In testimony whereof I affix my signature in presence of two witnesses.

ELI WAYLAND.

Witnesses:
B. T. OGLE,
WILLIAM F. YAGER.